(12) United States Patent
Voigt et al.

(10) Patent No.: US 11,931,970 B2
(45) Date of Patent: Mar. 19, 2024

(54) APPARATUS AND METHOD FOR PRODUCING A FILM-COVERED COMPONENT

(71) Applicant: Ford Global Technologies, LLC, Dearborn, MI (US)

(72) Inventors: Torsten Voigt, Roesrath (DE); Aydemir Kaplangiray, Alsdorf (DE); Stefan Martin Buerger, Hilden (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/496,169

(22) Filed: Oct. 7, 2021

(65) Prior Publication Data
US 2022/0105691 A1    Apr. 7, 2022

(30) Foreign Application Priority Data

Oct. 7, 2020 (DE) .......................... 102020126194.2

(51) Int. Cl.
*B29C 65/74* (2006.01)

(52) U.S. Cl.
CPC ........ *B29C 65/749* (2013.01); *B29C 65/7453* (2013.01)

(58) Field of Classification Search
CPC .............. B29C 65/7453; B29C 65/749; B29C 65/7433; B29C 65/7457; B29C 66/0326; B29C 66/0346; B29C 66/81455; B32B 38/0004
See application file for complete search history.

(56) References Cited

U.S. PATENT DOCUMENTS

| | | | | |
|---|---|---|---|---|
| 5,656,306 A | * | 8/1997 | Makiguchi | ................ B26F 3/12 |
| | | | | 156/212 |
| 5,913,996 A | * | 6/1999 | Ikegame | ................ B29C 51/08 |
| | | | | 156/212 |
| 2018/0345619 A1 | | 12/2018 | Lang et al. | |

FOREIGN PATENT DOCUMENTS

| | | |
|---|---|---|
| CN | 103752685 | 1/2016 |
| CN | 104226798 | 8/2016 |
| CN | 105499431 | 11/2017 |
| CN | 105946206 | 12/2017 |
| CN | 107774801 | 3/2018 |
| DE | 102014208952 | 11/2015 |

* cited by examiner

*Primary Examiner* — George R Koch
(74) *Attorney, Agent, or Firm* — Burris Law, PLLC

(57) ABSTRACT

An apparatus and method for producing a film-covered component, having at least one assembly nest with at least one component section, on which a component to be covered can be arranged includes operating a film severing device. The film severing device is arranged on the assembly nest and has a severing element. The film severing device surrounds the component section at least partially laterally at a distance.

18 Claims, 3 Drawing Sheets

APPARATUS AND METHOD FOR PRODUCING A FILM-COVERED COMPONENT

CROSS-REFERENCE TO RELATED APPLICATIONS

Figure 1:
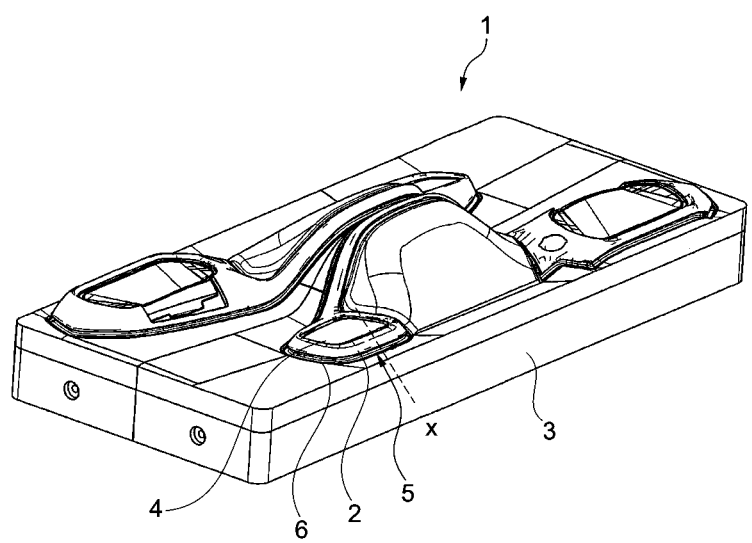

This application claims priority to and the benefit of German Patent Application No. 102020126194.2, filed on Oct. 7, 2020. The disclosure of the above application is incorporated herein by reference.

FIELD

The present disclosure relates to an apparatus and method for producing a film-covered component.

BACKGROUND

The statements in this section merely provide background information related to the present disclosure and may not constitute prior art.

In the case of film covering of components, a component is provided with a film, which is joined to the component by material bonding. For this purpose, the component to be covered is first deposited on an assembly nest, after which a film is applied or drawn onto the component with the aid of a pressure difference. The film is fed either as a sheet or from a roll.

In the case of production of a film-covered component, the separation of excess film material, which projects laterally beyond the component provided with the film, takes up a substantial part of the production time. Such a separation is typically carried out by means of a set of knives in a separate production step or by a punching device connected in series downstream of a film covering device having the assembly nest. This is disadvantageous particularly in applications with limited available space and leads to increased machine complexity if this conventional separation process is to take place as an inline process.

CN104226798B discloses a stamping process for producing sheet metal parts for motor vehicles. CN105946206B discloses a vacuum shaping technology for attaching a leather skin to a motor vehicle instrument panel. CN107774801A discloses a construction method for a pressing tool for producing sheet metal body parts. U.S. Pub. No. 2018/0345619 A1 discloses a corrugated sheet processing device. CN103752685B discloses a stamping process for a motor vehicle trim component. CN105499431B discloses a punch forming process for a car roof covering. DE102014208952A1 discloses a press-bound tool for burr-free shearing of a sheet metal workpiece formed from sheet metal material. The disclosures of CN104226798B, CN105946206B, CN107774801A, U.S. Pub. No. 2018/0345619 A1, CN103752685B, CN105499431B, DE102014208952A1 are incorporated herein in their entireties by reference.

Thus, traditional apparatuses and methods for producing film-covered components in high volume production environments can take up considerable space and involve complex machines. The teachings of the present disclosure address these and other issues associated with traditional apparatuses and methods for producing film-covered components. Additionally, the teachings of the present disclosure can also shorten a time for the production of a film-covered component.

SUMMARY

This section provides a general summary of the disclosure and is not a comprehensive disclosure of its full scope or all of its features.

According to one form of the teachings of the present disclosure, an apparatus has at least one film severing device arranged on the assembly nest, having a severing element, where the film severing device surrounds the component section at least partially laterally at a distance.

It should be noted that the features and measures presented individually in the following description can be combined with one another in any technically feasible manner and indicate further forms of the disclosure. The description additionally characterizes and specifies the disclosure, in particular in conjunction with the figures.

According to one form of the disclosure, the separation of film sections which project laterally beyond the component provided with the film can take place directly on the assembly nest after the film has been arranged on the component. In this way, the time for the production of a film-covered component can be significantly reduced in comparison with conventional procedures, since the finishing step typically required can be dispensed with in that this finishing step is now taken over by the film severing device integrated on the assembly nest. If the film-covered component has openings or apertures which are covered by the film, the film severing device can likewise be used to remove the film in this region. In another form, laser cutting methods or other severing methods can be used.

In one form, the component section can have a supporting surface for depositing the component to be covered, which can be designed to be complementary to a lower side of the component which can be brought into contact with the supporting surface and is not to be provided with the film. In one form, the assembly nest can also have two or more separate component sections, on each of which a separate component can be arranged, thus permitting a plurality of film-covered components to be produced simultaneously. In one form, the component section and/or the assembly nest as a whole can be designed as a die.

In one form, the film severing device can be partially or completely an integral component of the assembly nest. In one form, the film severing device can enclose the component section partially or completely laterally. In one form, the film severing device is arranged at such a distance laterally from the component section that film sections at the edge which are connected to the component over an extended area are not damaged by the severing operation carried out by means of the film severing device.

With the apparatus according to the disclosure, it is possible to produce film-covered components which are designed, for example, as motor vehicle components, in particular motor car components, for example in the configuration as elements of a dashboard.

According to an advantageous form of the present disclosure, the film severing device is arranged in a channel-shaped depression formed on the assembly nest, and has at least one tubular bladder or diaphragm, which is arranged at least partially within the depression and may optionally be fixed mechanically within the depression and whose inner cavity can be subjected to an excess pressure or a vacuum, and has at least one severing element arranged on a side of the bladder facing away from the assembly nest.

In one form, the depression can surround the component section at least partially laterally at a distance. In one form, the bladder or diaphragm is fixed within the depression, for example, via at least one undercut formed on the depression, behind which undercut a section of the bladder engages, ensuring that the bladder is connected in a captive manner to the assembly nest.

In one form, the tubular bladder extends in the longitudinal direction through the depression, and may optionally extend in such a way that the tubular bladder at least partially laterally surrounds the component section of the assembly nest. In one form, the tubular bladder can be produced from an elastomer or silicone and is designed to be collapsible.

According to one form of the present disclosure, on its side facing away from the assembly nest, the bladder may optionally have a U-shaped recess extending in the longitudinal direction, within which the severing element is partially arranged, at least in the collapsed state of the bladder, and to which the severing element is connected. In one form, in the collapsed state of the bladder, when the latter or its inner cavity is subjected to a vacuum or not to an excess pressure, the bladder can be arranged very largely in the depression. In one form, in this state, the severing element can also be arranged at least partially in the depression. In one form, the severing element is arranged completely in the depression. In one form, the U-legs of the recess surround the severing element in such a way that the severing element is virtually enclosed, thus avoiding unwanted severing of the film. In one form, if the inner cavity of the collapsed bladder is subjected to an excess pressure or not to a vacuum, the bladder expands and in the process displaces the severing element away from the assembly nest in the direction of the film extending over the depression until the severing element comes into contact with the film and severs the latter. In one form, if the inner cavity of the expanded bladder is subjected to a vacuum or not to an excess pressure, the bladder collapses again and in the process displaces the severing element in the direction of the assembly nest. In one form, the bladder can be connected to a device for generating an excess pressure and/or a vacuum, which can be part of the apparatus. In one form, a gaseous pressure medium, such as compressed air, is particularly suitable as the pressure medium. In an alternative form, a liquid pressure medium can be used.

In one form, if the severing element is a blade, the respective film section of the film is separated mechanically from the rest of the film by a cutting operation by means of the film severing device. In one form, the severing element in the configuration as a blade can be produced from a metal or a metal alloy. In one form, if the severing element is a heating element, that is to say, for example, an electric heating wire, the respective film section of the film is separated from the rest of the film by the action of heat by means of the film severing device.

According to yet another form of the present disclosure, the film severing device is arranged on a channel-shaped depression formed on the assembly nest and has, as a severing element, an electric heating element arranged at least partially above the depression. This form can be provided as an alternative or in addition to the abovementioned forms. In one form, the respective film section of the film is separated from the rest of the film by the action of heat by means of the film severing device. In one form, the depression can surround the component section at least partially laterally at a distance. In one form, the heating element can be an electric heating wire, for example.

According to still another form of the present disclosure, the film severing device has at least one thermal insulator, which may optionally be fixed mechanically within the depression, if the film severing device is provided with the electric heating element. In one form, the assembly nest is protected against an unwanted heat input by the thermal insulator. In one form, the insulator can be produced from a plastic or a ceramic, for example.

According to a further form of the present disclosure, a method having the features of claim 8, according to which a film section of the film which projects laterally beyond the component provided with the film is separated at least partially from the rest of the film by at least one film severing device arranged on the assembly nest.

In one form, features and advantages mentioned above in respect of the apparatus can be correspondingly associated with the method. In one form, the apparatus according to one of the abovementioned forms or a combination of at least two of these forms with one another can be used for carrying out the method. In one form, the component to be covered with film can be arranged automatically or manually on the component section of the assembly nest. In one form, the film can be arranged automatically or manually on the component to be covered with film.

According to one form, the film section is separated from the rest of the film by a cutting operation by the film severing device. In one form, the features and advantages mentioned above in respect of the corresponding form of the apparatus can be correspondingly associated with this form.

According to another form, the film section is separated from the rest of the film by the action of heat by the film severing device. In one form, the features and advantages mentioned above in respect of the corresponding form of the apparatus can be correspondingly associated with this form.

In one form, the apparatus can have a control element which controls the film covering of the component to be covered with film. In one form, the control of the film severing device can be integrated into the control element. In one form, the film severing device can thus be activated at a time close to the film covering process. Thus, it is possible to control the film severing apparatus arranged in or on the channel-shaped depression, that is to say to apply excess pressure or a vacuum, and/or to activate or deactivate the electric heating element. In one form, if the electric heating element is enclosed in the recess of the bladder, for example, the heating wire can be deactivated. In another form, the heating wire can be deactivated when the apparatus is being set up for film covering.

Further areas of applicability will become apparent from the description provided herein. It should be understood that the description and specific examples are intended for purposes of illustration only and are not intended to limit the scope of the present disclosure.

DRAWINGS

Figure 2:
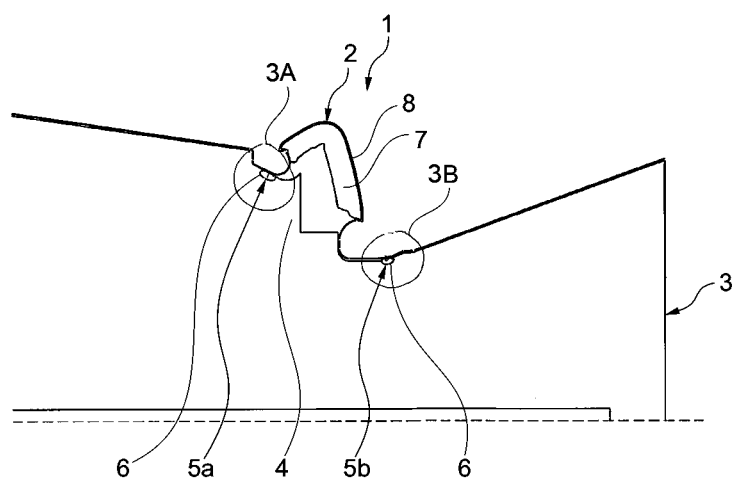
Figure 3A:
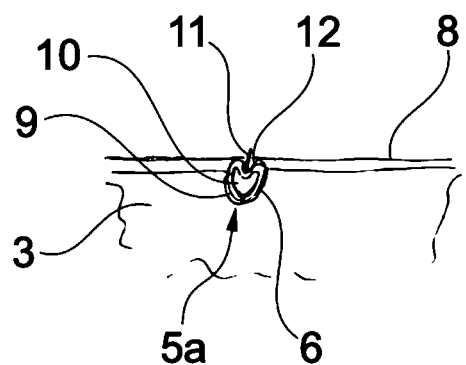
Figure 3B:
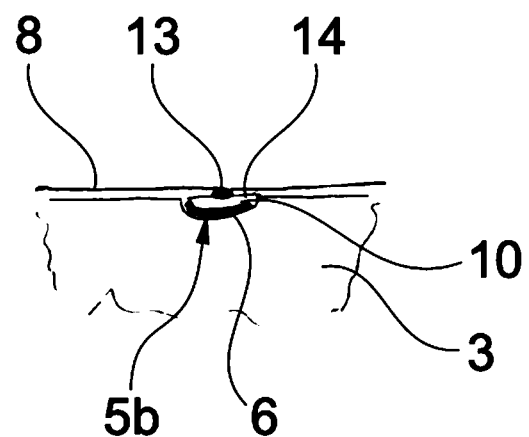

In order that the disclosure may be well understood, there will now be described various forms thereof, given by way of example, reference being made to the accompanying drawings, in which:

FIG. 1 is a schematic perspective view of an apparatus according to the teachings of the present disclosure, FIG. 2 is a schematic cross-sectional view of the apparatus of in FIG. 1, taken along line X shown in FIG. 1;

FIG. 3A is a cross-sectional view of the region 3A of the apparatus of FIG. 2, illustrated in greater detail with a film severing device of a first construction in accordance with the teachings of the present disclosure; and FIG. 3B is a cross-sectional view of the region 3B of the apparatus of FIG. 2, illustrated in greater detail with a film severing device of a second construction in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the different figures, identical parts are provided with the same reference signs, for which reason they are generally also described once and their description is not repeated.

FIG. 1 shows a schematic illustration of an example of an apparatus 1 according to the disclosure for producing a film-covered component 2 with complex geometry. In the example provided, the component 2 is a motor vehicle component, though other types of components can be produced.

The apparatus 1 has an assembly nest 3 with a component section 4, on which the film-covered component 2 is arranged, as a result of which the component section 4 in FIG. 1 is arranged in such a way as to be partially concealed. In the example of FIG. 1, a plurality of components can be covered with film at the same time. In addition, the apparatus 1 has a film severing device 5 arranged on the assembly nest 3, which surrounds the component section 4 laterally at a distance.

The film severing device 5 is arranged in or on a channel-shaped depression 6 formed on the assembly nest 3, which surrounds the component section 4 laterally at a distance. In addition, the film severing device 5 can have at least one tubular bladder (not shown), which is arranged at least partially within the depression 6 and may optionally be fixed mechanically within the depression 6 and whose inner cavity (not shown) can be subjected to an excess pressure or a vacuum, and at least one severing element (not shown), which is arranged on a side of the bladder facing away from the assembly nest 3. In this case, the film severing device 5 can be constructed, for example, in accordance with variant form shown in FIG. 3A, and can have a blade 11 as the severing element 11.

In an alternative form, the film severing device 5 can have at least one electric heating element (not shown), arranged at least partially above the depression 6, as a severing element and at least one thermal insulator (not shown), fixed mechanically within the depression 6. In this case, the film severing device 5 can be constructed, for example, in accordance with variant form shown in FIG. 3B.

FIG. 2 shows a schematic cross-sectional illustration taken along section line X of the apparatus 1 shown in FIG. 1. FIGS. 3A and 3B show two, alternative variant forms of the film severing device, which are indicated by reference numerals 5a and 5b, respectively. The film-covered component 2 has an uncovered component 7 and a film 8 applied to it.

The apparatus 1 has the assembly nest 3 with the component section 4, on which the component 7 to be covered with film can be arranged. The film 8 extends laterally beyond the component section 4. In addition, the apparatus 1 has the film severing device 5a, 5b, which is arranged on the assembly nest 3 and surrounds the component section 4 laterally at a distance.

FIG. 3A shows the first variant form of the film severing device 5a. This film severing device 5a is arranged in a channel-shaped depression 6 formed on the assembly nest 3, and has a tubular bladder 9, which is arranged at least partially within the depression 6 and is fixed mechanically within the depression 6 and whose inner cavity 10 can be subjected to an excess pressure or a vacuum, and has a blade 11 arranged on a side of the bladder 9 facing away from the assembly nest 3 as a severing element. The blade 11 is connected to the bladder 9. On its side facing away from the assembly nest 3, the bladder 9 has a U-shaped recess 12, within which the blade 11 is at least partially arranged. In a completely collapsed state (not shown) of the bladder 9, the blade 11 can be arranged within the recess 12, that is to say can be virtually enclosed. In this way, unintentional severing of the film during the setting up of the apparatus is avoided.

FIG. 3B shows the second variant form of the film severing device 5b. This film severing device 5b is arranged on a channel-shaped depression 6 formed on the assembly nest 3 and has an electric heating element 13, arranged at least partially above the depression 6, as severing element and a thermal insulator 14, which is fixed mechanically within the depression 6 and, in the example shown, is a tubular bladder corresponding to the first variant form (FIG. 3A). The heating element 13 is arranged on a side of the insulator 14 facing away from the assembly nest 3 and is connected thereto.

The apparatus 1 can be implemented with one of the film severing devices 5a and 5b or with a combination of the film severing devices 5a and 5b with one another.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for producing a film-covered component, the apparatus comprises:
    an assembly nest with a component section, on which a component to be covered can be arranged; and
    a film severing device arranged on the assembly nest, the film severing device including a severing element, wherein the film severing device surrounds the component section at least partially laterally at a distance and is configured to at least partially separate a film section of the film that projects laterally beyond the film-covered component from a remainder of the film, wherein the film severing device is arranged in a channel-shaped depression formed on the assembly nest, wherein the film severing device includes a flexible bladder arranged at least partially within the depression and fixed within the depression, wherein an inner cavity of the flexible bladder is configured to be subjected to a pressure or a vacuum to switch the flexible bladder between an inflated state and a deflated state, and wherein the severing element is arranged on a side of the flexible bladder facing away from the assembly nest and configured to engage the film section when in the inflated state and to not engage the film section when in the deflated state.

2. The apparatus according to claim 1, wherein the film severing device defines a recess, arranged on an opposite side from the assembly nest, configured to receive the severing element.

3. The apparatus according to claim 2, wherein when the flexible bladder is in the deflated state, the severing element is entirely received in the recess, wherein when the flexible bladder is in the inflated state, the severing element extends from the recess and protrudes from the depression.

4. The apparatus according to claim 3, wherein when the flexible bladder is in the deflated state, the severing element at least partially protrudes from the depression.

5. The apparatus according to claim 3, wherein when the flexible bladder is in the deflated state, the severing element entirely within the depression.

6. The apparatus according to claim 1, wherein the severing element is configured to sever the film section from the remainder of the film via a mechanical severing element, a thermal severing element, or a combination of a mechanical severing element and a thermal severing element.

7. The apparatus according to claim 1, wherein the severing element is configured to sever the film section from the remainder of the film via a mechanical severing element.

8. The apparatus according to claim 7, wherein the mechanical severing element includes a blade.

9. The apparatus according to claim 1, the severing element is configured to sever the film section from the remainder of the film via a thermal severing element.

10. The apparatus according to claim 9, wherein the thermal severing element includes an electric heating wire.

11. The apparatus according to claim 1, wherein the severing element includes a blade.

12. The apparatus according to claim 1, wherein the severing element includes an electric heating element.

13. The apparatus according to claim 12, wherein the film severing device includes at least one thermal insulator, which is fixed within the depression and on which the electric heating element is arranged.

14. A method for producing a film-covered component using the apparatus according to claim 1, the method comprising:
arranging the component to be covered on the component section of the assembly nest;
arranging the film on the component to be covered; and
operating the film severing device arranged on the assembly nest to at least partially separate the film section of the film that projects laterally beyond the film-covered component from the remainder of the film.

15. The method according to claim 14, wherein operating the film severing device includes performing a cutting operation to separate the film section from the remainder of the film.

16. The method according to claim 14, wherein operating the film severing device includes applying heat to the film to separate the film section from the remainder of the film.

17. The apparatus according to claim 1, wherein the depression extends in a longitudinal path to at least partially surround the component section and the flexible bladder has a tubular shape that extends longitudinally along the longitudinal path.

18. The apparatus according to claim 1, wherein when the flexible bladder is in the deflated state, the severing element entirely within the depression.

* * * * *